UNITED STATES PATENT OFFICE.

JOHN W. BARNETT, OF BIG SPRING, VIRGINIA, ASSIGNOR OF ONE-HALF HIS RIGHT TO WILLIAM ST. JOHN, OF HARRODSBURG, KENTUCKY.

IMPROVEMENT IN CURING LEAF-TOBACCO.

Specification forming part of Letters Patent No. 211,210, dated January 7, 1879; application filed February 2, 1878.

*To all whom it may concern:*

Be it known that I, JOHN W. BARNETT, of Big Spring, in the county of Montgomery and State of Virginia, have invented a new and valuable Improvement in Processes for Curing Leaf-Tobacco; and I do hereby declare that the following is a full, clear, and exact description of the operation of the same.

This invention has relation to the art of curing tobacco from the field; and it consists in the method or process hereinafter fully described.

The object of this invention is to shorten materially the time usually employed in this operation, so that the tobacco can be brought into market at an early date after cutting. Its object is also to produce from tobacco of ordinary growth the grades of cured tobacco most appreciated in the market at little expense of money or time.

The process is as follows for yellowing and toughening: In the first place I allow from one to two days for cutting and housing a barn of tobacco. Then the first fires are made under the tobacco, which is hung in the upper part of the barn. These fires are made at a little distance from each other on the ground floor, in the proportion of about sixteen fires to a barn twenty-two feet square. The fires are preferably built of charcoal, so as to have little or no smoke, and the temperature of the barn is kept for the first twelve hours at from 80° to 90° Fahrenheit, in the following manner: The firings are during this time renewed five times in succession, and water is sprinkled over the ground at each renewal. During the two first firings the barn is kept at from 80° to 85° temperature, and during the next three firings at 85° to 90°. Each firing should be kept at the above heat not longer than thirty-five or forty minutes. During the second twelve hours about seven firings should be made under the tobacco, the sprinkling being continued at each renewal, and the temperature of the barn during these firings being for the three first 85° to 90°, and for the next four 90° to 95°, these temperatures not to be continued at each firing over forty minutes. During the third twelve hours eight or nine firings are made, the water being sprinkled on the ground around the fires at each renewal, and the temperature being kept as follows: For the first three firings at 90° to 95°; for the next three at 92° to 97°, and for the two or three last at 95° to 100°, the heat during these twelve hours being never allowed to fall below 75° or 80°. During the next six hours there should be about seven firings, and the temperature from 105° to 110° or 112°, never being allowed during this time to fall below 80° or 85°. By this time the tobacco should be tough enough and yellow enough to commence raising the fires for curing. This process is especially adapted to fine tobacco. I have yellowed it in less time; but the average is about as stated. During the first part of this process the fires may be allowed to die out, or nearly out, between the firings, because the tobacco is at first more tender, and would otherwise commence to cure with too much green in it.

In the second place the mode of curing the tobacco, after it has been yellowed and toughened, is as follows: The fires, being arranged as above described for the first part of the process, are raised so that the temperature shall range during the first hour from 100° to 112°; second hour, from 112° to 120°; third hour, from 120° to 130°; fourth hour, from 130° to 145°; fifth hour, from 142° to 157°; sixth hour, from 155° to 162°; seventh hour, from 162° to 168°; eighth hour, from 165° to 170°; ninth hour, from 170° to 175°; tenth hour, from 175° to 180°; eleventh hour, from 180° to 185; and twelfth hour, from 185° to 200°. This process is for fine tobacco which has been well toughened and yellowed. If not sufficiently toughened and yellowed, the curing process should be carried on more slowly.

The doors of the barn or house should be opened at 115° or 120° temperature, and kept open a part of the time until the temperature is raised to 150°, then closed until the house is finished, except when opened for replenishing the fires. The object of this is to give the tobacco a chance to dry a little and let off the sweat or moisture; otherwise the drying and curing will be slower and the tobacco not so bright in color.

In this curing operation the water is used in the following manner: Holes are made in the floor of the barn of such size that each will hold about a bushel of charcoal, so that when the fires reach a temperature of 200° the coal will fall together as it burns. For a barn twenty-two feet square about sixteen of these holes will be required, and in proportion for larger or smaller barns. While waiting for the charcoal in these holes to commence burning, apply the water by sprinkling around the fires on the ground, making the ground very damp around and close to each fire, so that when the fires get to their highest heat the dampness of the atmosphere in the barn will be greatest, in order to keep the tobacco from drying and prevent setting the green in it. In all cases the floor of the house should be kept damp and the doors closed until the heat is 115° or 120°. Then the doors should be opened and the use of the water continued in the same manner until the temperature is 130° or 135°. Then the water is dispensed with.

The house or barn should be made close by daubing with clay or otherwise, in order that the quantity of coal and water required may be reduced to a minimum. For a twenty-two-foot barn, as above mentioned, the quantity of water required for each renewal will be, as nearly as it can be stated, from four to six bucketsful, or about six barrels of water for the house. The quantity of coal required may be stated at about one hundred bushels to a house of the character referred to. If the size of the barn is larger, or if the house is not close, more will be required. One man can do all the work, as he will have sufficient time to attend to the fires and use the water. The time required for the process of curing a house from the field, including the yellowing and toughening as the first part of the entire process or operation, is from three and one-half to five days, according to the quality of the tobacco, the finest tobacco taking the shortest time. The process, therefore, varies somewhat, according to the quality of the tobacco. The coarser and darker the tobacco is the longer the time and slower the process.

I am aware of the process of yellowing and curing tobacco described in the patent of C. W. Flippin, dated April 2, 1872, and I do not claim such invention, which is different from mine. I do not use steam. The temperature in my process never rises over 112° in the first or yellowing portion, and not over 200° in the latter or curing part.

What I claim as my invention, and desire to secure by Letters Patent, is—

The process of yellowing, toughening, and curing tobacco by renewed ground-firings and ground-sprinklings, at temperatures ranging from 80° to 112° in the first or yellowing and toughening part, and from 112° to 200° in the latter or curing part, with intermediate falls in the temperature, the hanging-house being closed except when the temperature is ranging from 115° to 150°, and the sprinkling being dispensed with at 135°, as specified.

In testimony that I claim the above I have hereunto subscribed my name in the presence of two witnesses.

JOHN W. BARNETT.

Witnesses:
THOS. M. NORTHCROSS,
GEO. P. LUCK.